H. F. WATSON.
RECEPTACLE.
APPLICATION FILED MAY 3, 1915.
1,212,428.
Patented Jan. 16, 1917.
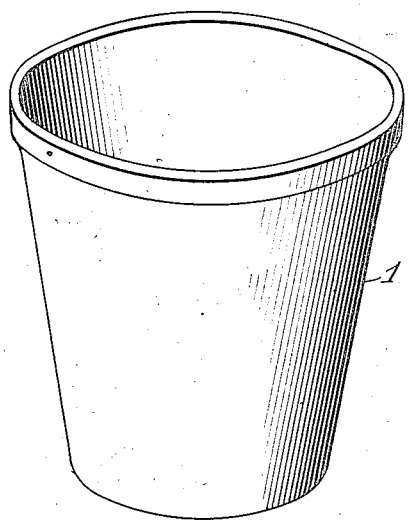
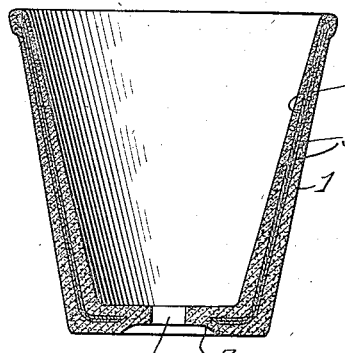
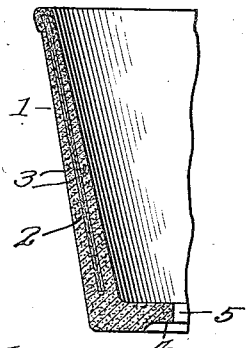
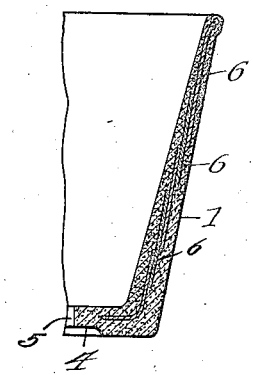
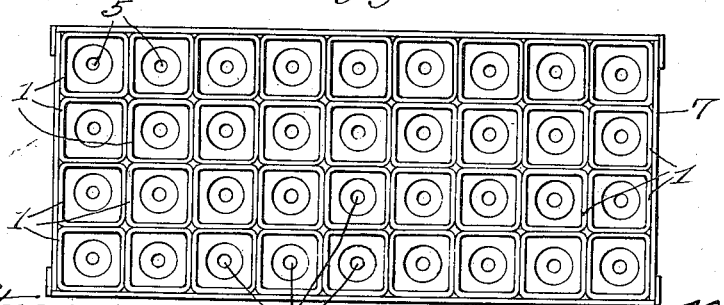
Inventor
Henry F. Watson
By Parker & Carter Attys
Witnesses

UNITED STATES PATENT OFFICE.

HENRY F. WATSON, OF CHICAGO, ILLINOIS, ASSIGNOR TO WATSON DEVELOPMENT COMPANY, OF CHICAGO, ILLINOIS, A CORPORATION OF ILLINOIS.

RECEPTACLE.

1,212,428.  Specification of Letters Patent.  Patented Jan. 16, 1917.

Application filed May 3, 1915. Serial No. 25,427.

*To all whom it may concern:*

Be it known that I, HENRY F. WATSON, a citizen of the United States, residing at Chicago, in the county of Cook and State of Illinois, have invented a certain new and useful Improvement in Receptacles, of which the following is a specification.

This invention relates to improvements in receptacles, and has for its object to provide a new and improved receptacle which shall have a flexible top portion and a stiff or rigid bottom portion.

The invention is illustrated in the accompanying drawings, wherein—

Figure 1 is a perspective view showing a receptacle embodying the invention; Fig. 2 is a sectional view therethrough; Fig. 3 is a sectional view showing a modified construction; Fig. 4 is a sectional view showing a further modified construction; Fig. 5 is a view showing a series of receptacles packed for shipping.

Like numerals refer to like parts throughout the several figures.

For purposes of illustration, I have shown a receptacle particularly adapted to be used in shipping growing flowers and plants from place to place. These plants are usually shipped in clay pots of circular cross section. The roots of the plants or flowers, surrounded by damp earth, are placed in these pots. One of the difficulties with the pots is that they are easily broken, being brittle, thereby disturbing the roots of the plants and causing injury and destruction of the plants. They are also difficult to pack, ship and handle because of their shape and their brittleness.

In constructing the device, I take flexible material, such for example, as paper, and saturate it with a suitable flexible cement into which there is preferably mixed a suitable fiber and some mineral substance in a more or less finely divided condition, the whole being formed in a mold into the proper shape, the bottom being made thicker than the top, the mineral substance giving the bottom a stiff or rigid character. In Fig. 1 I have shown a receptacle 1, made up in this manner. In Figs. 2, 3 and 4 I have shown different ways of constructing the receptacle. As illustrated in Fig. 2, I provide a comparatively thin piece of paper 2, which as illustrated, is shown in two layers. This paper is cut into the proper shape and is then saturated with the flexible cement 3 and placed in the mold and molded into shape, as illustrated. In this construction the paper does not extend entirely across the bottom 4 of the receptacle, the cement at the bottom being thicker than at the top, this result being secured by the shape of the mold, the cement, on account of the mineral material, making the bottom stiff or rigid. In the particular construction shown there is an opening 5 through the bottom of the receptacle. For pots for flowers and plants the cement should be water-proof so as to form a water-proof structure. One form of cement for this purpose may be made of resin or gilsonite dissolved in connection with some oxidized oil such as linseed oil, which produces a composition which remains permanently flexible, there being mixed with this some mineral substance such as mica or clay, and some fiber material such as hemp. This cement is heated to a temperature sufficient to melt it and the paper is then run through it so as to be saturated with it and covered by it, and is then placed in a mold and molded to the proper shape. The fiber adds to the strength of the flexible portion and is cheaper than the paper and permits a thin sheet of paper to be used and yet the required strength secured. The mineral matter gives firmness, hardness and rigidity to the bottom of the receptacle. When the paper is formed into proper shape, in the construction of Fig. 2, the edges overlap, and when the device is pressed in the mold it forms a unitary construction.

In Fig. 3 I have shown a modified form, in which the paper 2 does not extend to the bottom of the receptacle and is not bent over to form a part of the bottom, as shown in Fig. 2. In Fig. 3 I have shown the paper as consisting of a series of overlapping pieces 6. In this construction the adjacent pieces overlap and the edges of each piece overlap at their meeting ends. These several pieces are saturated with the cement and placed in the mold and pressed into shape as shown. By means of this construction I provide a receptacle which is flexible at the top and rigid at the bottom and which is also strong and durable, and which may also be water-proof, said receptacle not being brittle but the top and walls thereof adapted to be bent without injury. These receptacles may then be placed in a suitable box 7, for shipment, as shown in Fig. 5, the tops being bent so that the adjacent sides are flat, permitting them to be conveniently shipped and causing them to occupy less space than when circular.

I claim:

1. A receptacle comprising a flexible top portion, consisting of flexible material embedded in a flexible cement, and a stiff bottom portion.

2. A receptacle comprising a flexible material embedded in flexible cement so as to form a flexible top portion, said cement containing fiber so as to add to the strength of the top portion, said cement containing mineral matter formed into a bottom thicker than the top portion.

3. A water-proof receptacle comprising a flexible top portion consisting of a flexible material embedded in a water-proof flexible cement, and a bottom portion, also formed of said cement.

4. A receptacle comprising flexible material formed into shape and open at the bottom, a flexible cement in which said flexible material is embedded, said cement extending across the open bottom portion of said flexible material.

5. A receptacle comprising a flexible top portion consisting of flexible material, a flexible cement in which said material is embedded, said cement being thin at the top so as to permit the flexible material to retain its flexibility so that the top of the receptacle may be formed into various shapes after the receptacle is completed, the cement at the bottom portion being thickened so as to form a stiff bottom, the sides of the receptacle being inclined so that it is larger at the top than at the bottom.

In testimony whereof, I affix my signature in the presence of two witnesses this 20th day of April, 1915.

HENRY F. WATSON.

Witnesses:
MINNIE M. LINDENAU,
ELLA THIEME.